(12) United States Patent
Chien et al.

(10) Patent No.: US 8,360,794 B2
(45) Date of Patent: Jan. 29, 2013

(54) ELECTRICAL CONNECTOR HAVING A METAL SHELL WITH LOCKING TABS EXTENDING INTO A RECESS

(75) Inventors: Cheng-Ching Chien, Tu-Cheng (TW); Liang-Kai Lee, Tu-Cheng (TW)

(73) Assignee: Hon Hai Precision Ind. Co., Ltd, New Taipei (TW)

( * ) Notice: Subject to any disclaimer, the term of this patent is extended or adjusted under 35 U.S.C. 154(b) by 263 days.

(21) Appl. No.: 12/778,154

(22) Filed: May 12, 2010

(65) Prior Publication Data
US 2010/0291785 A1  Nov. 18, 2010

(30) Foreign Application Priority Data
May 12, 2009  (TW) .............................. 98208112 U

(51) Int. Cl.
*H01R 13/62* (2006.01)
(52) U.S. Cl. ...................................... 439/331
(58) Field of Classification Search .................. 439/331, 439/372, 157
See application file for complete search history.

(56) References Cited

U.S. PATENT DOCUMENTS

| 7,063,552 | B2* | 6/2006 | Matsunaga et al. ........... 439/331 |
| 7,270,559 | B1 | 9/2007 | Chen |
| 7,887,357 | B1* | 2/2011 | Yang .............................. 439/331 |
| 7,963,788 | B2* | 6/2011 | Hsu et al. ....................... 439/331 |
| 8,011,965 | B2* | 9/2011 | Zhang ............................ 439/630 |
| 8,062,048 | B2* | 11/2011 | Ma ................................ 439/331 |

* cited by examiner

*Primary Examiner* — Chandrika Prasad
(74) *Attorney, Agent, or Firm* — Wei Te Chung; Ming Chieh Chang

(57) ABSTRACT

An electrical connector includes an insulating housing defining a pair of pivotal grooves on two opposite sides of a front end thereof and a L-shaped recess at each side thereof. A plurality of contacts are arranged in the housing. A metal shell defines a pair of pivotal posts sliding assembled in the pivotal grooves, the metal shell rotating downward to cover on the insulating housing. The shell defines a locking element extending to the front end of the housing and inserted in the L-shaped recess to lock the metal shell with the insulating housing.

7 Claims, 7 Drawing Sheets

ELECTRICAL CONNECTOR HAVING A METAL SHELL WITH LOCKING TABS EXTENDING INTO A RECESS

BACKGROUND OF THE INVENTION

1. Field of the Invention

The present invention relates to an electrical connector, and more particularly to an electrical connector with a cover rotatably assembled on an insulating housing.

2. Description of the Related Art

U.S. Pat. No. 7,270,559 issued to Cheng-Yi Chen on Sep. 18, 2007 discloses a conventional electrical connector receiving a card-like component. The electrical connector comprises an insulating housing, a plurality of contacts and a metal shell pivotally connected to the housing. The housing includes a pair of sidewalls and each sidewall defines a first groove having a guiding opening and a second groove in the front of the first groove. The shell defines a pair of columns which are placed into the grooves via the guiding openings and slide in the first and second grooves. After the shell rotates from a slantwise opened position to a horizontal closed position, the shell is needed to move forwards so that a front extending tab on the shell is inserted into a recess on the sidewall of the housing which will prevent the shell from being removed away from the housing in the upright direction. During the rotation of the shell with respect to the housing, the columns are easily moved from the first groove into the second groove due to a forward decomposition force exerted on the shell, which will result that the shell can not cover on the housing horizontally because of the front extending tab resisting on the top face of the sidewall.

In view of the above, a new electrical connector that overcomes the above-mentioned disadvantages is desired.

SUMMARY OF THE INVENTION

Accordingly, an object of the present invention is to provide an electrical connector with an improved locking element by which a process of the cover to the housing is convenient.

To fulfill the above-mentioned object, an electrical connector includes an insulating housing defining a pair of pivotal grooves on two opposite sides of a front end thereof and a L-shaped recess at each side thereof; a plurality of contacts arranged in the housing; a metal shell defining a pair of pivotal posts sliding assembled in the pivotal grooves, the metal shell rotating downward to cover on the insulating housing; wherein the shell defines a locking element extending to the front end of the housing and inserted in the L-shaped recess to lock the metal shell with the insulating housing.

Other objects, advantages and novel features of the invention will become more apparent from the following detailed description when taken in conjunction with the accompanying drawings.

DETAILED DESCRIPTION OF THE PREFERRED EMBODIMENT OF THE INVENTION

Figure 1:
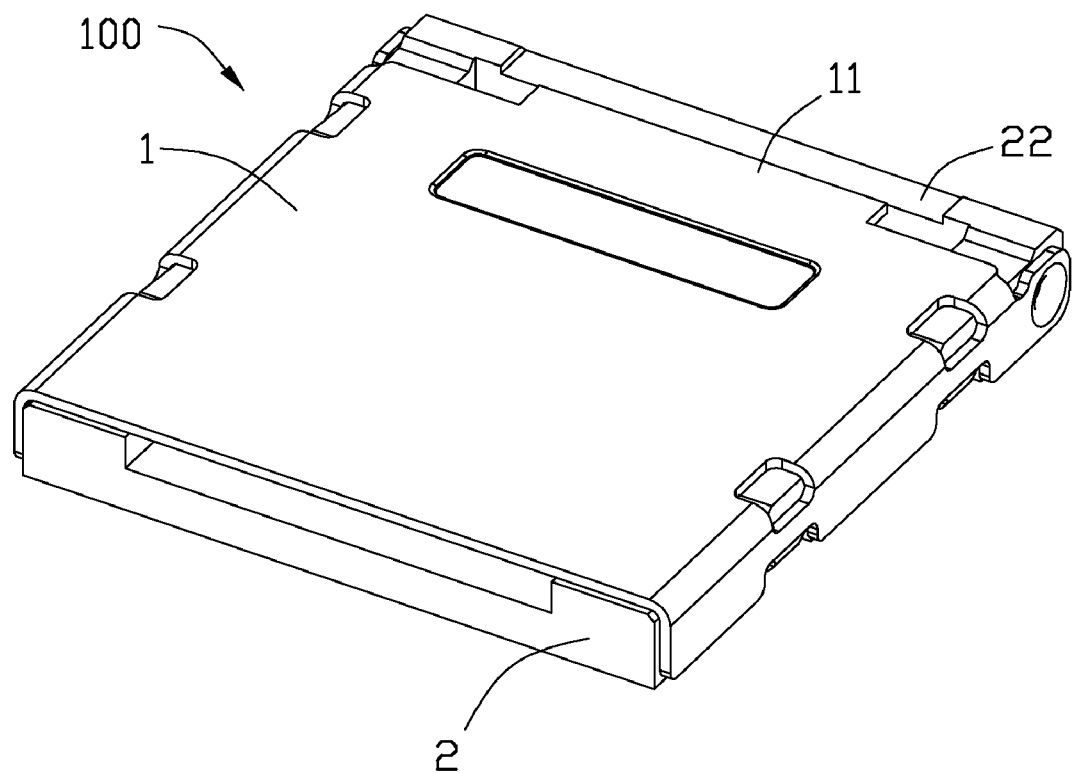
FIG. 1 is a top and front perspective view of an electrical connector of the present invention.
Figure 2:
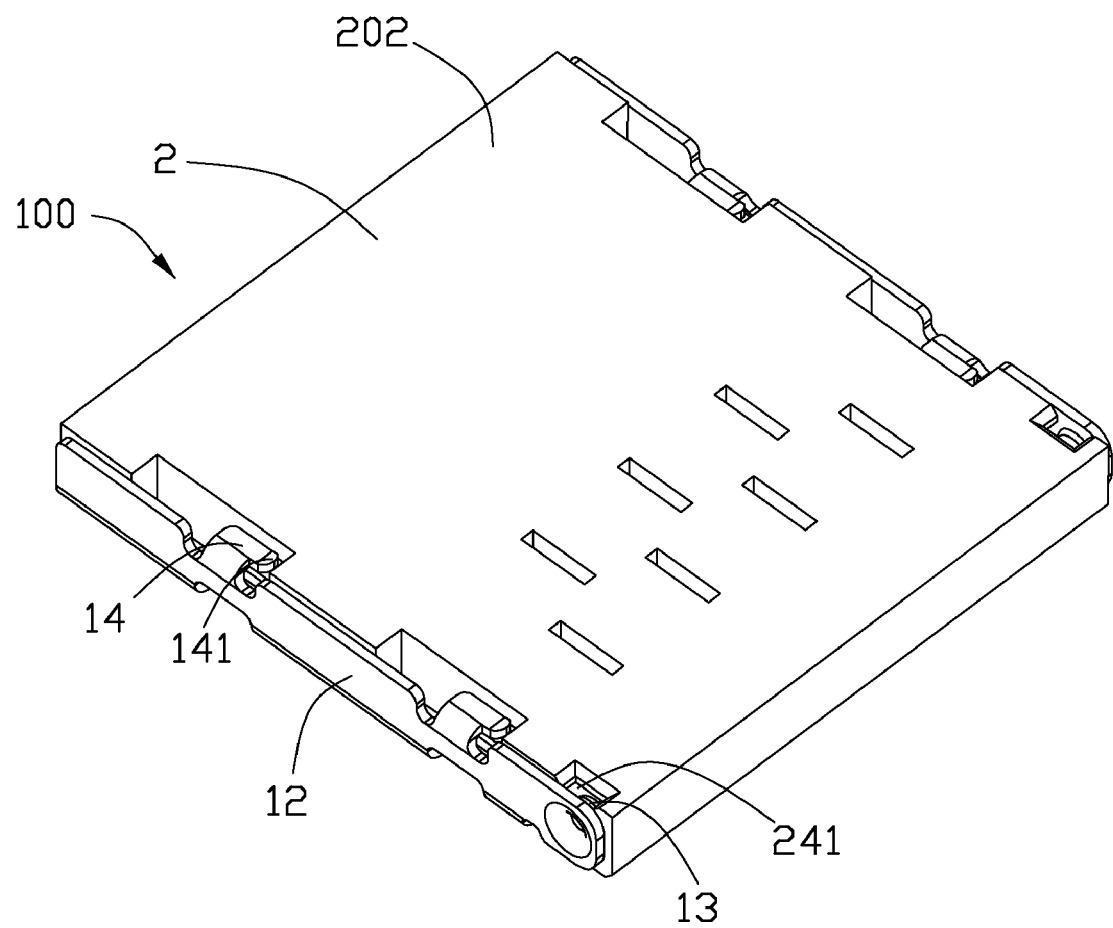
FIG. 2 is a bottom and rear perspective view of the electrical connector.

Reference will now be made to the drawings to describe the present invention in detail.

Referring to FIGS. 1-4, an electrical connector 100 for receiving a card-like component or similar module 4 therein, comprises a metal shell 1, an insulating housing 2 and a plurality of contacts 3 secured in the housing.

Figure 3:
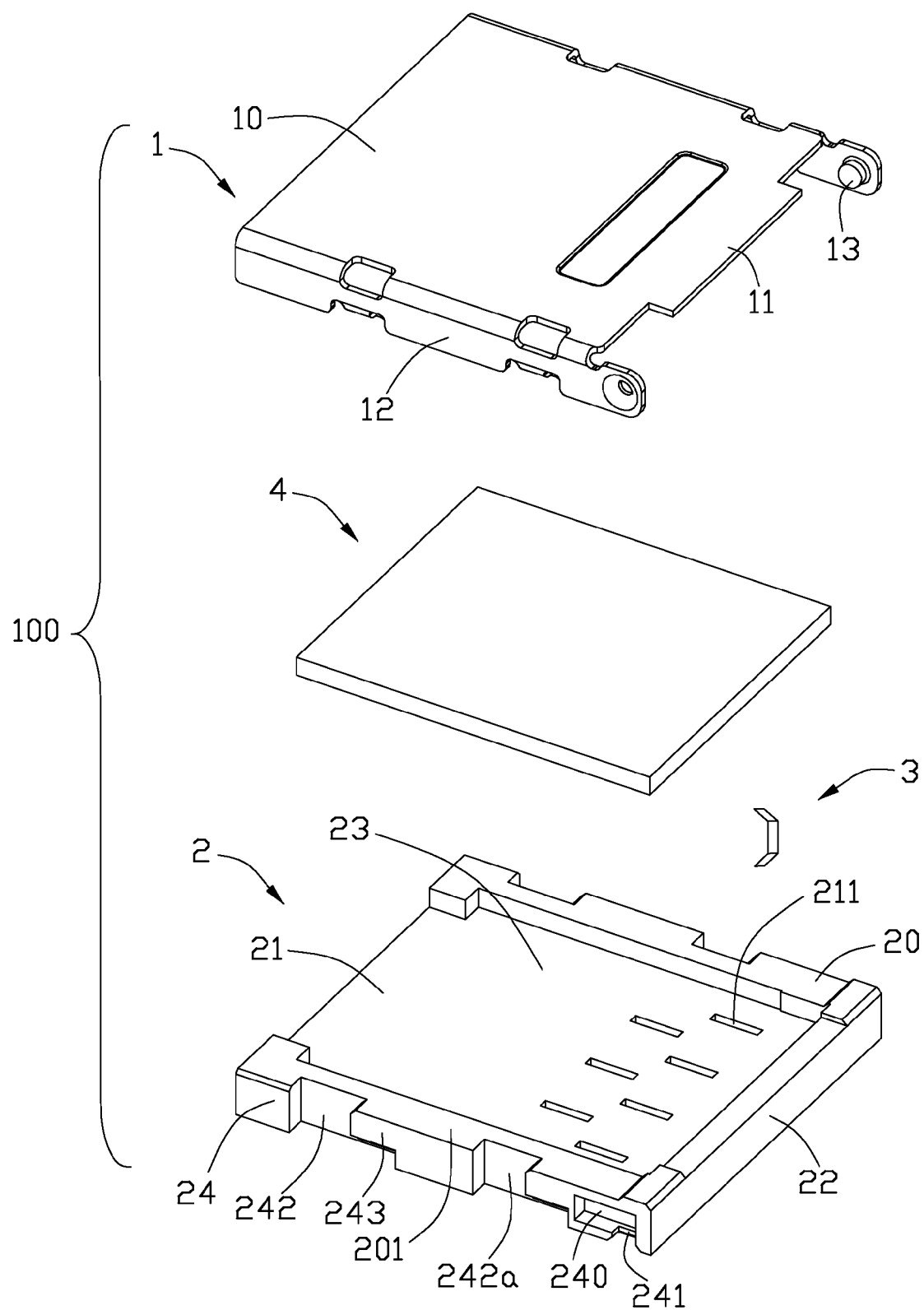
FIG. 3 is an exploded view of the electrical connector with a module from a top view.
Figure 4:
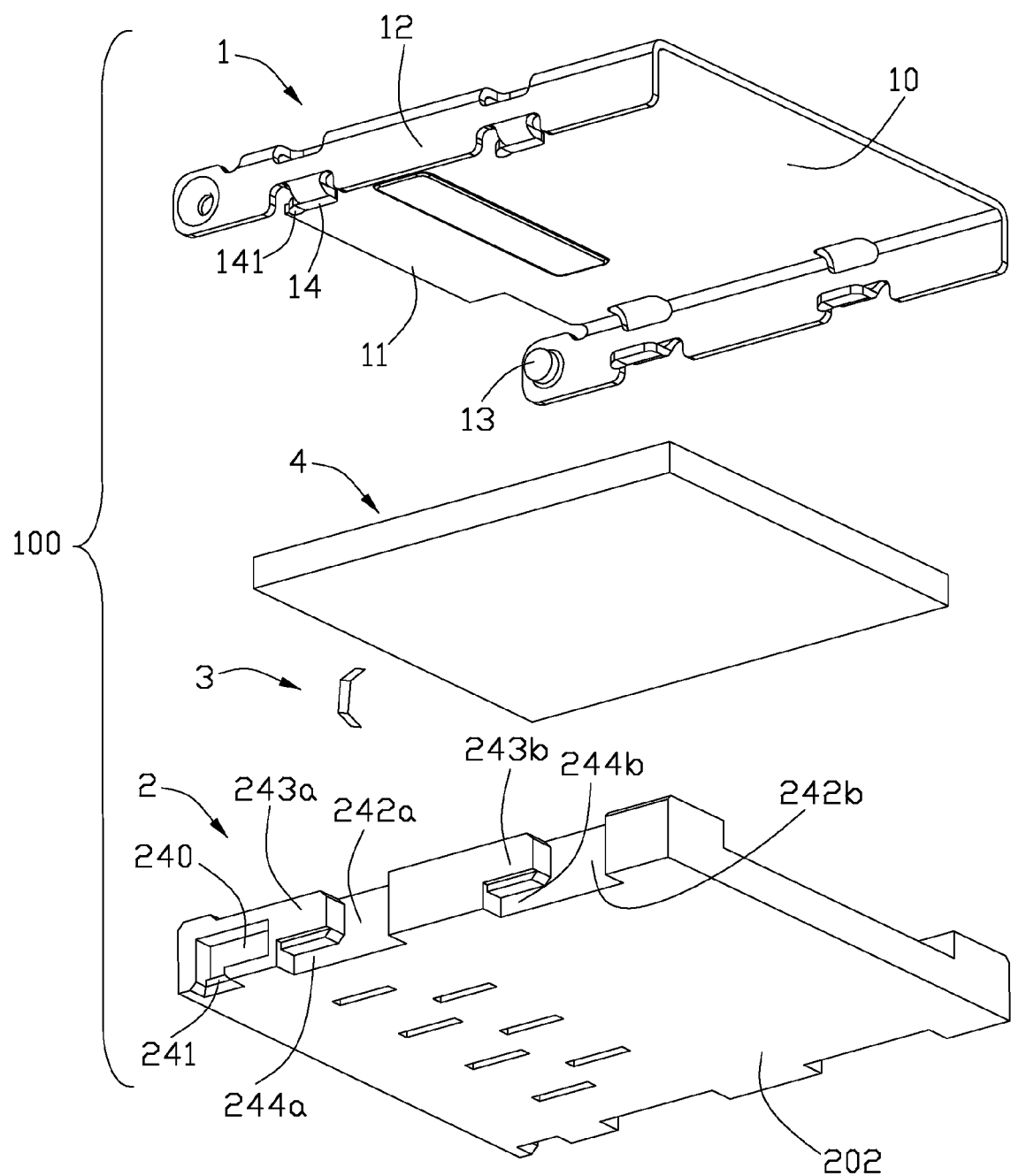
FIG. 4 is an exploded view of the electrical connector with the module from a bottom view.

Referring to FIGS. 3-4, the insulating housing 2 comprises a bottom wall 21 and a plurality of peripheral walls 20 extending upwards from the bottom wall 21 commonly defining a receiving room 23 to receive the module 4. The peripheral walls 20 include a pair of sidewalls 24 on the two opposite sides of the bottom wall 21 and a front wall 22 bridging the two sidewalls 24. The bottom wall 21 defines a plurality of terminal-receiving grooves 211 to receive the contacts 3. Each sidewall 24 defines a pivotal groove 240 extending along a horizontal direction of the housing and a guiding opening 241 running through a bottom face 202.

The shell 1 comprises a top plate 10 and a pair of side plates 12 extending downwards from two sides of the top plate 10. A pair of pivotal posts 13 are forming at front ends of two side plates 12 and facing inward. The pivotal posts 13 are placed into the corresponding pivotal grooves 240 via the guiding openings 241 and slide in the pivotal grooves 240.

Each sidewall 24 of the housing 2 further defines two first recesses 242a, 242b running through the top and bottom faces 201, 202 of each sidewall 24 along the front to rear direction, one first recess 242a is near to the pivotal groove 240 and two second recesses 244a, 244b extending forward from the first recesses 242a, 242b so that the corresponding first and the second recess form a L-shaped recess. A pair of corresponding stopping portions 243a, 243b is located at the corner of the corresponding L-shaped recesses and the second recesses 244 are located under the stopping portions 243. The shell 1 further includes two locking elements 14 formed from bottom edges of the side plates 12 and bending inward. Each locking element 14 has a free tab 141 extending horizontally from a front side to the pivotal post 13 and bending downwards. When the locking elements 14 are placed in the second recesses 244, and the locking elements are abut against the bottom faces of the stopping portions 243 and the tabs 141 are resisted on front faces of the second recesses 244 to secure the housing 2 and the shell 1. During the shell 1 is assembled to the housing 2, the locking elements 14 are inserted into the first recesses 242 and then move forwards into the second recesses 244.

Figure 5:
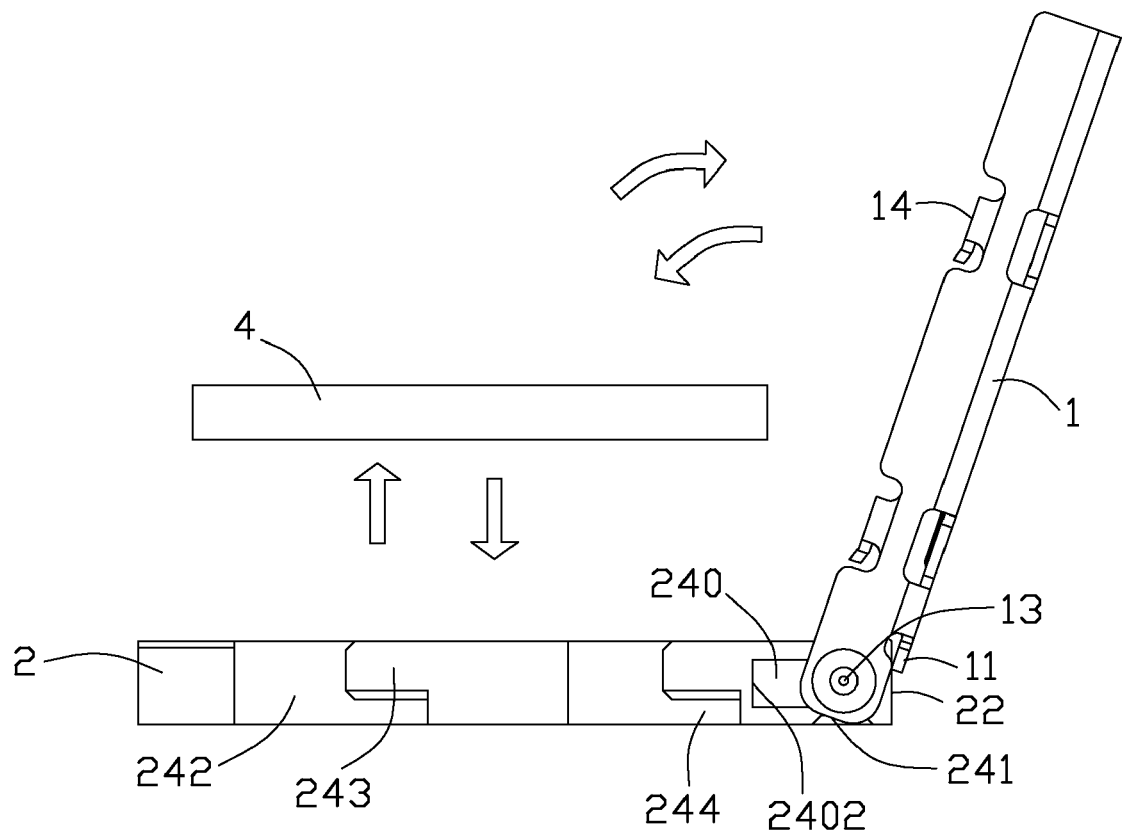
FIG. 5 is a side schematic view of the electrical connector inserted with the module while a shell is open.
Figure 6:
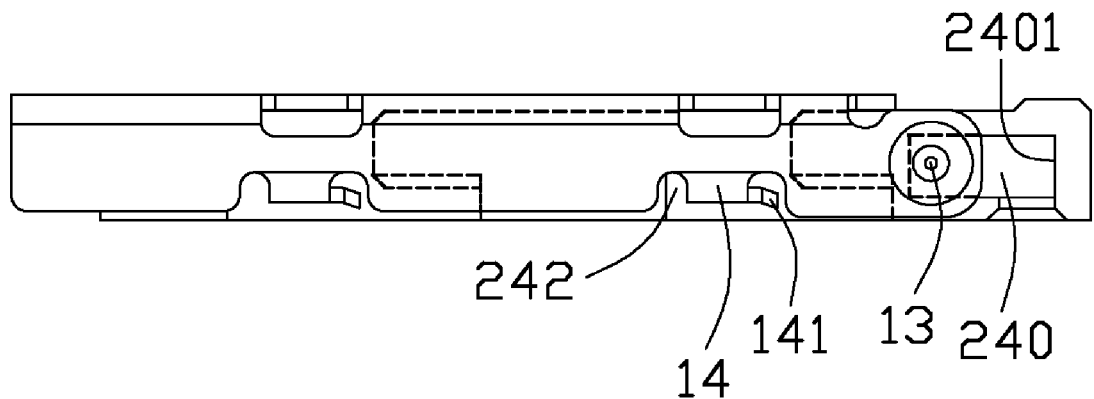
FIG. 6 is a side schematic view of the electrical connector inserted with the module while the shell is in an unlocked position.

The shell 1 includes a positioned portion 11 extending horizontally from a front edge of the top plate 10. Referring to FIG. 5, when the shell 1 is opened, the pivotal elements 13 seat near the guiding opening 241 and the positioned portion 11 is resisted on a front side of the front wall 22 to keep an angle between the shell 1 and the housing 2 at 90 degrees to 135 degrees so that the shell 1 can not be rotated excessively thus avoiding any damage being caused to the electrical connector. The module 4 is placed into the receiving room 23 vertically and then the shell 1 is rotated downwards around the pivotal elements 13 until the shell 1 is parallel to the housing 2 wherein the locking elements 14 are accommodated in the first recesses 242 and the pivot posts 13 shift to rear ends 2402 of the pivotal grooves 240 finally as best shown in FIG. 6. Please note, said front to rear directions is defined from a pivot end to another end of the housing. The rear end is far away from the guiding opening.

Figure 7:
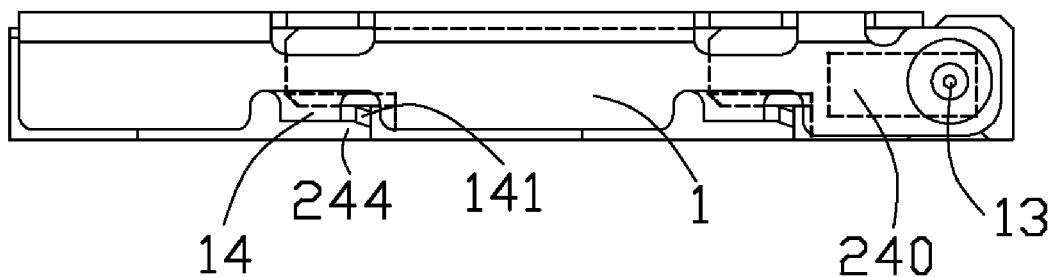
FIG. 7 is a side schematic view of the electrical connector inserted with the module while the shell is in a locked position.

Referring to FIG. 7, when the shell 1 is moved horizontally forwards in the pivotal grooves 240, the locking elements 14 are sliding into the second recesses 244 and the tabs 141 are pressing against to the front face of the second recesses 244 to prevent the shell 1 from being taken away from the housing 2 in an upright direction.

Referring to FIGS. 5, 6, during the shell 1 is rotating with respect to the housing 2, the pivot posts 13 move from front ends 2401 to rear ends 2402 of the pivotal groove 24 due to a forward decomposition force exerted on the shell 1. The stopping portions 243 are in the rear of the corresponding first recesses 242, so the locking elements 14 can go in the first recesses 242 without any blockage when the shell 1 covers on the housing 2 horizontally.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An electrical connector, comprising:
   an insulating housing defining a pair of pivotal grooves on two opposite sides of a front end thereof and a L-shaped recess at each side thereof;
   a plurality of contacts arranged in the housing;
   a metal shell defining a pair of pivotal posts sliding assembled in the pivotal grooves, the metal shell rotating downward to cover on the insulating housing; wherein the shell defines a locking element extending to the front end of the housing and inserted in the L-shaped recess to lock the metal shell with the insulating housing;
   wherein each L-shaped recess comprises a first recess running through a top face of the housing and a second recess extending from the first recess to the front end of the housing, the locking element moving from the first recess into the second recess and are upwards limited by a stopping portion of the housing forming above the second recess.

2. The electrical connector as claimed in claim 1, wherein each locking element has a free tab bending downwards and pressing against to a front face of the second recess when the locking elements are resisted on bottom faces of the stopping portions.

3. An electrical connector for receiving a card-like module, comprising:
   an insulating housing defining a pair of pivotal grooves on front ends of two opposite sides thereof and a plurality of stopping portions;
   a plurality of contacts receiving in the housing;
   a metal shell pivotally connecting to the housing defining a pair of pivotal posts moving from front ends to rear ends of the pivotal grooves when the shell is rotating relative to the housing and a plurality of locking elements;
   the housing further defining first recesses in the rear of the stopping portions, the locking elements placed in the first recesses when the shell is covered on the housing horizontally and unlocked to the housing.

4. The electrical connector as claimed in claim 3, wherein the housing defines second recesses extending forward from the first recesses and under stopping portions, the locking elements moved from the first recesses into the second recesses when the shell moves forwards.

5. The electrical connector as claimed in claim 4, wherein the first recesses are running through a top and bottom faces of the housing, the locking elements inserting into the first recesses along the vertical direction.

6. An electrical connector comprising:
   an insulative housing defining an upward receiving room in an upper face, and a pair of side arms located by two sides of the receiving room;
   an L-shaped recess formed in a side face of one of the side arms and upwardly and rearwardly confronting a stopping portion on said one of the side arms so as to form a first recess extending through the housing in a vertical direction and a second recess upwardly hidden by said stopping portion in said vertical direction;
   a plurality of contacts disposed in the housing with contacting sections extending upwardly into the receiving room;
   a metallic shell pivotally assembled around a rear end of the housing, said shell including a top plate covering the receiving room in said vertical direction and a pair of side plates downwardly extending from two opposite sides of the top plate,
   an opening formed in a side region of the top plate adjacent to one of the side plates;
   a locking element formed on a bottom edge of said one of the side plates and aligned with said opening in the vertical direction; whereby
   when the shell is moved to a locked position, the locking element is located in the second recess and hidden under the stopping portion and the shell can not rotate; when the shell is moved to an unlock position, the locking element is located in the first recess and upwardly exposed to an exterior in the vertical direction to indicate the shell is ready to rotate.

7. The electrical connector as claimed in claim 6, wherein the shell is located rearwardly farther in the locked position than in the unlocked position.

* * * * *